United States Patent
Bills et al.

(10) Patent No.: US 10,254,122 B2
(45) Date of Patent: Apr. 9, 2019

(54) SYSTEM AND METHOD FOR CONTROLLING RIDE COMFORT IN A VEHICLE

(71) Applicant: INTERNATIONAL BUSINESS MACHINES CORPORATION, Armonk, NY (US)

(72) Inventors: Tierra Bills, Nairobi (KE); Reginald Bryant, Nairobi (KE); David Kaguma, Nairobi (KE); Michiaki Tatsubori, Kanagawa (JP); Aisha Walcott, Nairobi (KE); John Mbari Wamburu, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/151,921

(22) Filed: May 11, 2016

(65) Prior Publication Data
US 2018/0038705 A1  Feb. 8, 2018

(51) Int. Cl.
*G01C 21/34* (2006.01)
*G05D 1/02* (2006.01)
*G01C 21/36* (2006.01)
*G05D 1/00* (2006.01)

(52) U.S. Cl.
CPC ....... *G01C 21/3484* (2013.01); *G01C 21/367* (2013.01); *G01C 21/3688* (2013.01); *G05D 1/0212* (2013.01); *G05D 1/0285* (2013.01); *G05D 1/0088* (2013.01)

(58) Field of Classification Search
CPC .............. G01C 21/3484; G01C 21/367; G01C 21/3688; G05D 1/0285; G05D 1/0212; G05D 1/0088
See application file for complete search history.

(56) References Cited

U.S. PATENT DOCUMENTS

| | | | |
|---|---|---|---|
| 6,484,092 B2 | 11/2002 | Seibel | |
| 7,406,371 B2 | 7/2008 | Izawa et al. | |
| 8,566,035 B2 | 10/2013 | Boss et al. | |
| 8,718,925 B2 | 5/2014 | Letchner et al. | |
| 2003/0033063 A1 | 2/2003 | Kawashima et al. | |
| 2012/0053805 A1 | 3/2012 | Dantu | |
| 2014/0222330 A1* | 8/2014 | Kohlenberg | G01C 21/3484 701/425 |

FOREIGN PATENT DOCUMENTS

| | | |
|---|---|---|
| JP | 2005306119 A | 11/2005 |
| JP | 2005306119 A | 11/2005 |

* cited by examiner

*Primary Examiner* — Yuen H Wong
(74) *Attorney, Agent, or Firm* — Eyal Gilboa; Otterstedt, Ellenbogen & Kammer, LLP (57) ABSTRACT

Herein is disclosed methods and systems for automated route analysis and recommendation of preferred routes. Recommended routes may be vehicle specific, and custom-selected based on historical data and weighting factors such as road roughness and traversal time.

17 Claims, 7 Drawing Sheets

SYSTEM AND METHOD FOR CONTROLLING RIDE COMFORT IN A VEHICLE

FIELD OF THE INVENTION

In embodiments, the technical field of the invention is methods and systems for automated route analysis and navigation.

BACKGROUND

Many developing countries are resource-constrained and often have poorly maintained road infrastructure. In those places, there are many uncomfortably rough roads—e.g., unpaved (earth road), poorly paved (e.g. ballast pavement), slightly paved—and many small bumps or cracks due to poor maintenance. Such road may be more than uncomfortable—in some cases they may be damaging to the vehicle or even dangerous to traverse.

Existing navigation systems provide recommended routes between geo-locations, typically based on route distance, and/or historical or real-time traffic data. Some existing navigation systems can help drivers avoid hazards. In all such systems the decision is left to the driver whether to take or not take a route. In many instances this is not practical in developing countries, as the information may be incomplete, or the driver may not be able to adequate analyze the choices while simultaneously considering contextual information such as weather, etc. Furthermore, a driver often desires but is unable to estimate the cost (in terms of time, wear on the car, riskiness of the route, etc.) of selecting one route over another route.

SUMMARY OF THE INVENTION

In an aspect is a method comprising the steps: determining a first predicted damage factor and a first predicted traversal time associated with a vehicle traversing a first route; determining a second predicted damage factor and a second predicted traversal time associated with the vehicle traversing a second route different from the first route; calculating a recommended route based on the weighted first and second predicted damage factors and the weighted first and second predicted traversal times; and communicating the recommended route to a user. In embodiments:

the user is an autonomous driver system and the recommended route comprises a set of instructions configured to cause the autonomous driver system to proceed along the recommended route;

the user is a human driver and the recommended route comprises a set of directions suitable for output in a driver alert system;

the first route is between a first geo-location and a second geo-location, and wherein the second route is between the first geo-location and second geo-location;

the first route is a sequence of connected road segments, each with an associated roughness factor, and wherein the first predicted damage factor is determined based on the roughness factors of the road segments of the first route, and wherein the second route is a sequence of connected road segments, each with an associated roughness factor, and wherein the second predicted damage factor is determined based on the roughness factors of the road segments of the second route;

the determined first and second predicted damage factors are specific to the vehicle;

calculating the recommended route further factors a history of the vehicle selected from historical sensor data collected by the vehicle along at least one of the road segments on the recommended route, and an aggregated wear factor determined from sensor data collected by the vehicle over a period of the vehicle's history;

the first route is a sequence of connected road segments, each road segment having an associated roughness factor, the roughness factor being determined from historical sensor readings obtained from one or more vehicles fitted with one or more sensors and traversing the road segment;

the determined first and second predicted damage factors are determined for an average speed for the first and second routes, respectively;

the recommended route is selected to minimize damage to the vehicle and to simultaneously minimize time required to traverse the route; and the recommended route comprises a recommended sequence of connected road segments and wherein the vehicle traverses the sequence of road segments of the recommended route.

In an aspect is a method for reducing damage to a vehicle traveling from a first geo-location to a second geo-location, the method comprising: transmitting, from a server via a network, a recommended route to a device on the vehicle, the device configured to receive the recommended route and instruct a user to take the recommended route, wherein the recommended route is selected from at least two available routes connecting the first and second geo-locations, and is selected at least in part to optimize predicted traversal time and predicted damage factor. In embodiments:

the predicted traversal time and predicted damage factor for each available route is determined from sensor data obtained from prior vehicle traversals of the respective route;

the method further comprises determining an identifying characteristic of the vehicle and a status of the vehicle, wherein the recommended route is selected at least in part on the determined identifying characteristic and status;

the user is an autonomous driver system and the recommended route comprises a set of instructions configured to cause the autonomous driver system to proceed along the recommended route; and the user is a human driver and the recommended route comprises a set of directions suitable for output in a driver alert system.

In an aspect is a system comprising a processor, a memory couple to the processor, the memory configured to store program instructions for instructing the processor to carry out the method as above. In embodiments:

the system further comprises a communications module coupled to the processor and configured to communicate the recommended route;

the system further comprises a device configured to be disposed in the vehicle and receive the communicated recommended route.

In an aspect is a system comprising a processor, a memory couple to the processor, the memory configured to store program instructions for instructing the processor to carry out the steps: (a) receive an inquiry from a user device specifying a first geo-location and a second geo-location; and (b) calculate the aggregate predicted traversal time and aggregate predicted damage factor for at least two available routes between the first and second geo-locations; (c) select a recommended route from the at least two available routes, the selection at least in part made to optimize predicted traversal time and predicted damage factor; (d) transmitting, via a network and using a communications module, the recommended route to the user device, wherein the transmitted recommended route is configured such that the user device, upon receiving the recommended route, carries out an action selected from: modifying a graphical user interface to display the recommended route; and initiating an autonomous driving system to navigate a vehicle along the recommended route. In embodiments, the memory is further configured to store program instructions for instructing the processor to carry out the additional steps: (e) receive sensor data from a plurality of vehicles traversing a road segment; (f) calculate a predicted traversal time and a predicted damage factor for the road segment based on the received sensor data; (g) repeat steps (e) and (f) for a plurality of road segments to calculate a plurality of predicted traversal times and predicted damage factors for the plurality of road segments.

These and other aspects of the invention will be apparent to one of skill in the art from the description provided herein, including the examples and claims.

DETAILED DESCRIPTION OF VARIOUS EMBODIMENTS

In an aspect is a method comprising the steps: determining a first predicted damage factor and a first predicted traversal time associated with a vehicle traversing a first route; determining a second predicted damage factor and a second predicted traversal time associated with the vehicle traversing a second route different from the first route; calculating a recommended route based on the weighted first and second predicted damage factors and the weighted first and second predicted traversal times; communicating the recommended route to a user.

In an aspect is a method for reducing damage to a vehicle traveling from a first geo-location to a second geo-location, the method comprising: transmitting, from a server via a network, a recommended route to a device on the vehicle, the device configured to receive the recommended route and instruct a user to take the recommended route, wherein the recommended route is selected from at least two available routes connecting the first and second geo-locations, and is selected at least in part to optimize predicted traversal time and predicted damage factor.

In an aspect is a system comprising a processor, a memory couple to the processor, the memory configured to store program instructions for instructing the processor to carry out the method disclosed herein.

In an aspect is a system comprising a processor, a memory couple to the processor, the memory configured to store program instructions for instructing the processor to carry out the steps: (a) receive sensor data from a plurality of vehicles traversing a road segment; (b) calculate a predicted traversal time and a predicted damage factor for the road segment based on the received sensor data; (c) repeat steps (a) and (b) for a plurality of road segments to calculate a plurality of predicted traversal times and predicted damage factors; and (d) receive an inquiry from a user device specifying a first geo-location and a second geo-location; and (e) calculate the aggregate predicted traversal time and aggregate predicted damage factor for at least two available routes between the first and second geo-locations.

In an aspect is a system comprising a processor, a memory couple to the processor, the memory configured to store program instructions for instructing the processor to carry out the steps: (a) receive an inquiry from a user device specifying a first geo-location and a second geo-location; and (b) calculate the aggregate predicted traversal time and aggregate predicted damage factor for at least two available routes between the first and second geo-locations; (c) select a recommended route from the at least two available routes, the selection at least in part made to optimize predicted traversal time and predicted damage factor; (d) transmitting, via a network and using a communications module, the recommended route to the user device, wherein the transmitted recommended route is configured such that the user device, upon receiving the recommended route, carries out an action selected from: modifying a graphical user interface to display the recommended route; and initiating an autonomous driving system to navigate a vehicle along the recommended route.

Figure 1:
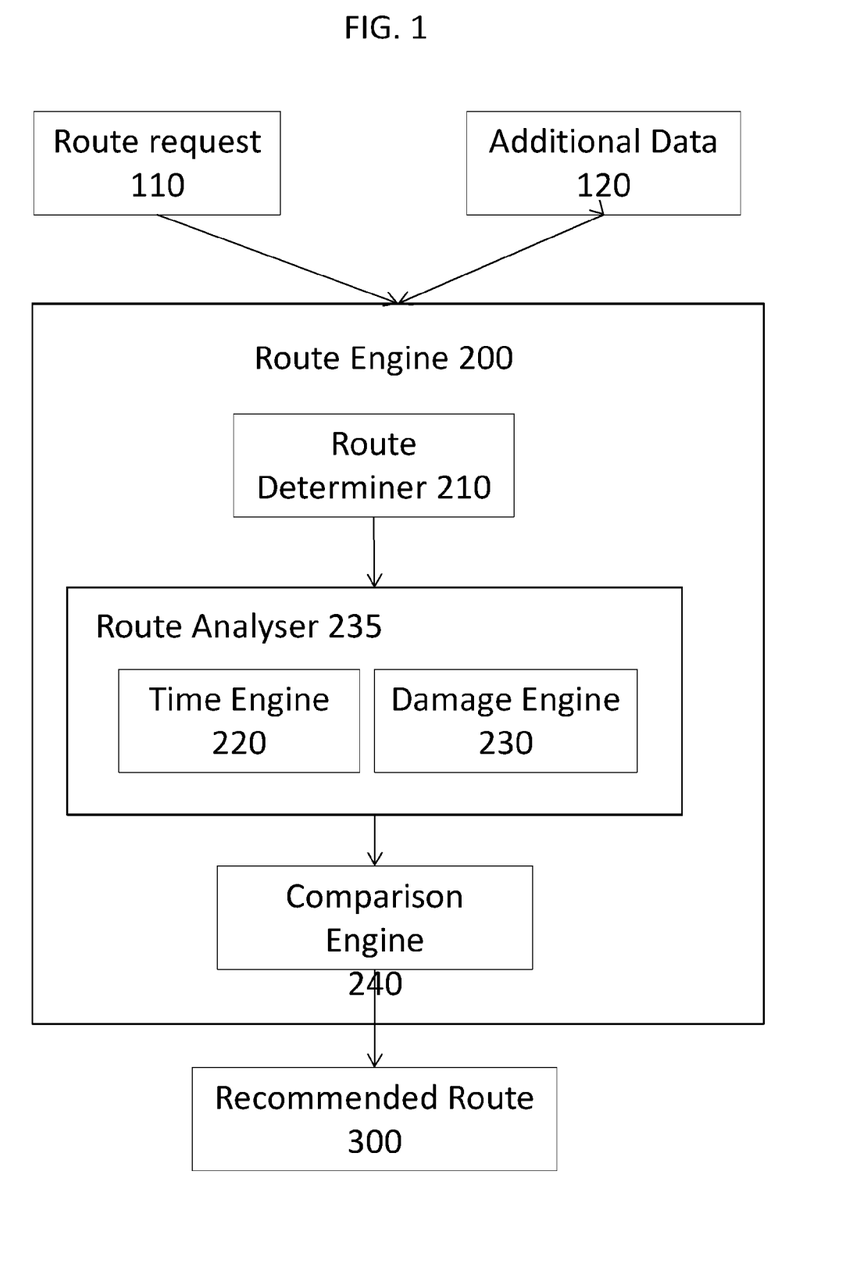
FIG. 1 provides a flow chart showing determination of a recommended route from a route request according to an embodiment of the invention.

With reference to FIG. 1, there is shown Route Engine 200, with various inputs and outputs. In embodiments, route engine 200 (and other supporting components as appropriate) is implemented on a remote server that is in communications with a network, e.g., via a communications module (not shown). Any suitable network may be used, including all forms of cellular networks (3G, 4G, GSM, etc.), WiFi or BlueTooth networks, LAN or other fixed networks, and the like. Communications between route engine 200 and external devices such as user devices and certain providers of data will be via such network. Route engine 200 will contain any necessary component(s) and circuitry in order to effectuate such communications, examples including a subscriber identity module (SIM), networking card, power source, and the like.

FIG. 1 provides an overview of an embodiment of the methods disclosed herein. Route request 110 as well as additional data 120 (e.g., weather reports or the like, as described in more detail herein) are provided to route engine 200. Within route engine 200, a variety of modules are used to calculate an output, specification recommended route 300. Some such modules are shown in FIG. 1. For example, route determiner 210 is a module that determines possible routes that satisfy the route request, as described herein. Route determiner 210 determines a potential route and then communicates the potential route to route analyser 235, which comprises a pair of engines, time engine 220 and damage engine 230. Time engine 220 determines a predicted traversal time—i.e., the amount of time that it is likely to take to traverse the potential route, given a number of assumptions and variables (e.g., driver characteristics, weather, etc.) as described herein. Damage engine 230 determines a predicted damage factor—i.e., the amount of damage that is likely to be incurred to the vehicle of the requesting user by traversing the potential route, given a number of variables (e.g., driver characteristics, vehicle type, etc.) as described herein. In some embodiments, the two engines report such information to comparison engine 240, which module aggregates the predicted traversal time and predicted damage factor for a given route. Alternatively, route analyser 235 may aggregate the predicted traversal time and predicted damage factor for a given potential route and communicate such aggregated information to comparison engine 240. In embodiments, route determiner 210 provides a plurality of potential routes (e.g., 2, 3, 4, 5, or more than 5 routes), and communicates each route to time engine 220 and damage engine 230. Accordingly, comparison engine 240 (or route analyser 235) aggregates the predicted traversal time and predicted damage factor for each potential route.

Comparison engine 240 then compares the routes to select a recommended route. For example, as explained herein, the comparison may involve an algorithm that weights the predicted traversal time and predicted damage factor in order to minimize traversal time and minimize damage factor, or may use weightings that sacrifice one for the other (e.g., a higher traversal time for a lower damage factor). In embodiments, the weighting is directly determined using user input—i.e., the user can specify which factor is more important in a given situation. In other embodiments, the weighting is automatically determined based on factors such as those described herein.

It will be appreciated that, if the route determiner module detects only a single route between the starting location and the destination location, the system will output the identified route and no comparisons will be needed. In such situations, however, the system may be used to calculate the predicted damage factors if the route is traversed at various speeds, and communicate such information to the user.

Figure 2:
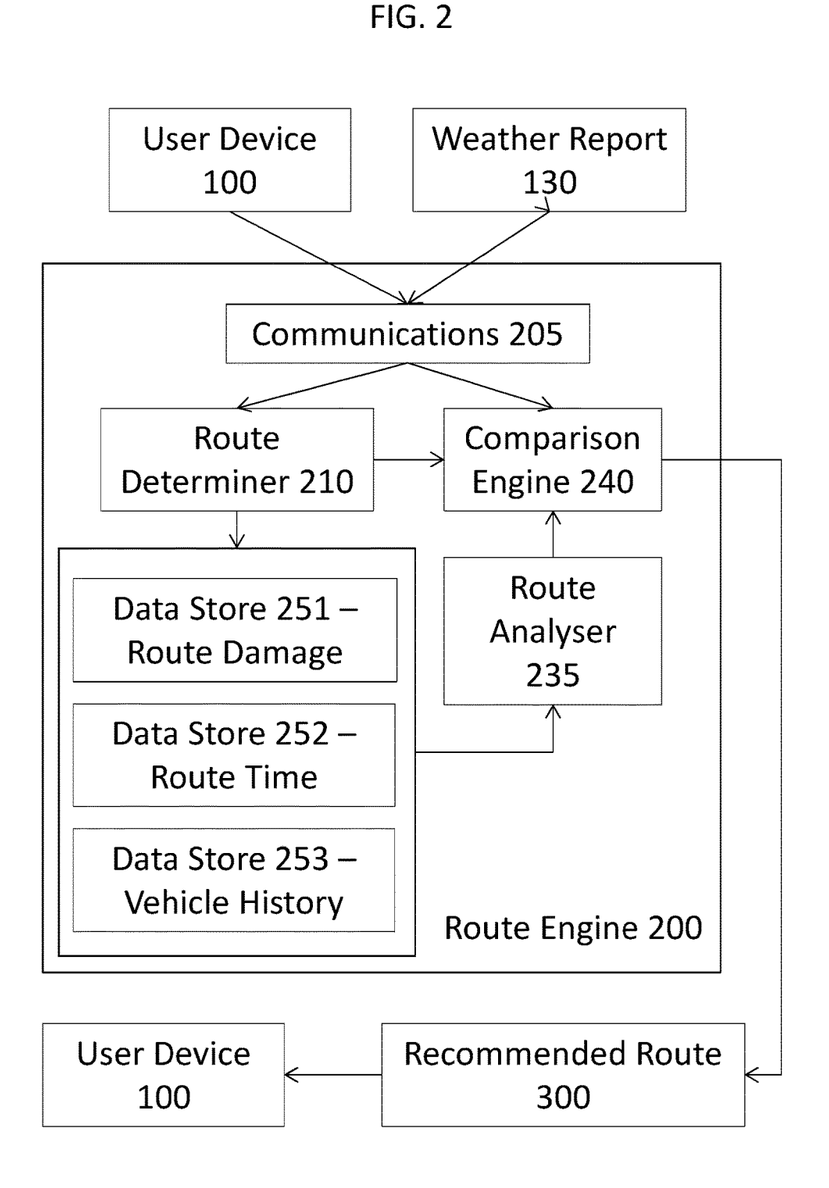
FIG. 2 provides a flow chart showing the interaction of components of a route engine according to an embodiment of the invention.

With Reference to FIG. 2, route engine 200 receives information from a variety of sources such as user device 100. In embodiments user device 100 is an electronic device installed (i.e., integrated into) or present in a vehicle. A cellular-enabled device such as a smart phone, tablet, or the like can function as a user device, including a device that can interface directly with the vehicle (e.g., a Bluetooth enabled device or the equivalent) and provide instructions directly to the vehicle such as to an autonomous control system in the vehicle. Alternatively or in addition, the device can be a dedicated device that is factory installed (or post manufacturing installed) into the vehicle and, in embodiments, configured to interface with the vehicle such as an autonomous vehicle control system. The vehicle in which user device 100 is located and making the route request may be referred to herein as a requesting vehicle.

Other sources of input can also be present and can provide data to route engine 200. For example, weather report 130 can be provided from an appropriate weather reporting service. In embodiments, the weather report can be requested by route engine 200, such as a request for a weather report for a specific location relevant to the input from the user device. Alternatively or in addition, a general weather report for a plurality of locations can be delivered automatically on a schedule. In addition to weather reports, other information can also be delivered to route engine, such as traffic reports, crime and other emergency reports, road maintenance reports, and the like, including any such external information that may impact vehicle traversal of roadways.

User device 100 provides input to route engine 200. In embodiments, such information includes a pair of geo-locations: a user-defined destination location (also referred to herein as a second geo-location), and a starting location (also referred to herein as a first geo-location). The starting location can be automatically communicated for devices that are GPS-enabled or otherwise able to determine the location of the device. The starting location can alternatively be user-input, such as for user devices that are not GPS-enabled, user devices that are not otherwise able to determine the location of the device, or instances where the user desires a starting point other than the actual current location of the device. The destination location and any user-input starting location can be a set of coordinates, a landmark, a road intersection, or any other means of specifying a location.

In FIG. 2, the information provided to route engine 200 is received by communications module 205, which module communicates via a network to receive incoming data, and routes the data as appropriate to the various modules of route engine 200. For example, certain data (e.g., starting and ending locations) are appropriate to send to route determiner 210, whereas other information may be suitable to send to other components (e.g., vehicle identity or weather reports may be suitable to send to comparison engine 240). In embodiments, communications 205 sends the route request (e.g., starting and ending coordinates) to route determiner 210, which determines one or more suitable potential routes.

Each potential route as determined by route determiner 210 is a series of connected road segments. Each road segment may be uniform in length or they may vary depending on the topography, intersection frequency, or other variables as appropriate. For example, a road segment may be in the range of 5-1000 linear feet of roadway, such as 5, 10, 15, 20, 25, 30, 35, 50, 75, 100, or more than 100 linear feet of roadway. The connected route segments are referred to as a route.

In embodiments, a potential route is sent to a data store, which is a database maintained in route engine 200 (or, alternatively, maintained elsewhere and such data is retrieved as needed) of data pertaining to known route segments, known vehicles and their histories, known drivers and their characteristics, and other data as appropriate. Route damage for each segment along the potential route is in the form of roughness factors for the segment, and these are retrieved from data store 251. Traversal times for each segment along the potential route are retrieved from data store 252. Vehicle history, i.e., previous traversals of the same route segments by the requesting vehicle, may also be retrieved from data store 253. Other information may also be retrieved from the data store as necessary. Examples include stored data pertaining to a driver, such as the driver's driving history, training and capabilities, previous reports of damaged vehicles, driver characteristics (e.g., aggressive, defensive, etc.), and the like.

Data in the data store is "historical data", meaning that the data is collected by vehicles that previously traversed road segments and communicated data to route engine 200 for storage in the data store. For example, a plurality of vehicles may traverse a road segment, each vehicle containing a user device communicating traversal data (e.g., traversal time, speed, GPS data, sensor data such as accelerometer data, gyroscopic data, etc.) to route engine 200. From the data gathered by such sampling vehicles, a component in route engine 200 (e.g., route analyser 235) may calculate a predicted traversal time and a predicted damage factor for the road segment. Such calculations may further factor in the type of vehicle used as a sampling vehicle. This process may be repeated for each and every road segment in a region in order to build a suitable database (e.g., data stores 251, 252, etc.). The historical data may be collected, for example, by a user device operating in a data collection mode.

The historical data collected from previous traversals by vehicles may be used, in embodiments, to identify specific road hazards (potholes, speed bumps, etc.) and may further be used to calculate an overall roughness factor for a road segment. In embodiments, each segment in the data store has an associated roughness factor—either a default value, or a value determined from historical data, or an estimated value (e.g., based on roughness factors of adjacent segments, or calculated using a variety of known estimation techniques). The overall roughness factor may be used to calculate a predicted damage factor. Alternatively or in addition, historical data may be used to directly calculate damage factors.

Data from the data store is sent to route analyser 235, mentioned elsewhere herein. Route analyser 235 aggregates the information for the various segments along a potential route, applies a suitable algorithm (e.g., summation, weighted summation, etc.), and determines an aggregated predicted traversal time and predicted damages factor for the route. This information is transferred to comparison engine 240. Other information from communications 205 may be directly transferred to comparison engine 240, such as weather or other reports and the like. In embodiments, the type of vehicle (e.g., saloon car, four wheel drive vehicle, light truck, delivery van, etc.) may be information provided by user device 100. Such information may be passed directly to comparison engine 240, in which case the comparison engine can factor vehicle type into the comparison algorithm. Alternatively, in embodiments, such information may be passed to the data store, particularly where data has been previously collected and stored according to the type of vehicle that was used to collect the data. For example, the predicted damage factor may be calculated (e.g., by the route analyser) by taking into account the type of the requesting vehicle. Generally, larger vehicles such as four-wheel drive vehicles will incur less damage for a given stretch of road compared with smaller vehicles such as saloon car. Thus, predicted damage factors may be specific to the requesting vehicle. Furthermore, predicted damage factors may be determined for various speeds at which a vehicle can traverse a road segment. The historical data obtained and stored in the data store is, in embodiments, specific to the speed travelled by the sampling vehicle. Scaling factors, averages, and other methods may be used to determine an "average" speed at which the driver is likely to traverse the road segment, and the predicted damage factor for a route may be calculated based on such average speed.

Although not shown in FIG. 2, comparison engine 240 may receive information directly from a data store, where appropriate.

Comparison engine 240 receives routes from route determiner 210, route analysis (i.e., predicted damage factors and predicted traversal times) from route analyser 235, and other information such as vehicle type, driver characteristics, weather, and the like. A further piece of information that may be received by comparison engine 240 includes a direct or indirect indication of the driver's (i.e., the driver of the requesting vehicle) preferred weighting. Thus, the driver can indicate that preference be given to finding a route with a lower traversal time, even at the expense of a higher damage factor, or vice versa. A direct indication of weighting factors may, in embodiments, include the driver's specified amount of preference—e.g., the driver can indicate (via user device 100, and communicated to comparison engine 240 via communications 205) that low traversal time is some selected percentage or factor more important than a low damage factor. An indirect indication of weighting factors may, in embodiments, include the driver specifying characteristics of the route, such as maximizing highways over city streets or the like. In embodiments, the weighting factors are automatically determined. For example, the weighting factors may be determined to simultaneously optimize (i.e., minimize) predicted traversal time and predicted damage factor.

Wherever possible, route determiner 210 will determine a plurality of potential routes, including at least a first potential route and a second potential route. Throughout this disclosure, only two potential routes will be discussed for the sake of clarity and simplicity, but it will be appreciated that more than two potential routes may be determined, and all determined potential routes may be compared to determine the recommended route. In embodiments, all such determined potential routes are between the same first and second geo-locations to ensure fairness in the comparisons.

Comparison engine 240 receives route analysis (i.e., predicted damage factors and predicted traversal times) from route analyser 235 for first and second potential route, and other information as mentioned previously. Using appropriate weighting factors (either as determined by the driver, or as applied automatically, or otherwise), comparison engine 240 selects the route that most suitably satisfies the route request. The selected route is referred to as recommended route 300, and is then transmitted to user device 100. Accordingly, it can be stated that route engine 200 generates and communicates recommended route 300 to a user. The recommended route, as mentioned herein, is a sequence of connected road segments.

The methods herein may further comprise determining an identifying characteristic of the requesting vehicle, a history of the vehicle, and/or a status of the vehicle. An identifying characteristic includes information other than the type of vehicle, such as a specific model, a Vehicle Identification Number (VIN), an equipment specification (e.g, non-standard suspension, elevated ground clearance, etc.). A history of the vehicle may include historical sensor data collected by the vehicle along at least one of the road segments on the recommended route, or an aggregated wear factor determined from sensor data collected by the vehicle over a period of the vehicle's history. A status may include information such as the mileage on the vehicle, whether warning indicators or error codes have been activated on the vehicle, a fuel level, and/or the operability or non-operability of vehicle components such as traction control or other ride-assist component. The recommended route may be selected factoring in any or all of this information.

In embodiments, user device 100 receives the recommended route and carries out an action (i.e., the system or a component thereof, such as a server, communicates the recommended route to the user such as user device 100, and user device 100 receives and implements the recommended route or communicates the recommended route to a human user). The action by user device 100 will depend in part on the identity of the user. In embodiments, the user is an autonomous driver system and the recommended route comprises a set of instructions configured to cause the autonomous driver system to proceed along the recommended route. In embodiments, the user is a human driver and the recommended route comprises a set of directions suitable for output in a driver alert system. In embodiments, the vehicle traverses the recommended route upon receiving the communication of the recommended route (i.e., sequence of recommended road segments) from route engine 200. In embodiments, the recommended route 300 is communicated to a user device 100 and causes a graphical user interface (GUI) on the user device to change to a navigational mode, thereby communicating the recommended route to the driver. Alternatively or in addition, the recommended route 300 can be communicated to a general purpose device or another device with a GUI that is then caused to change and show the recommended route (e.g., the route may be showed overlaid on a larger map, or as a sequence of directions, or in any other way that effectively communicates the recommended route to the driver).

In embodiments, there is a feedback control mechanism that allows the vehicle or a driver (user) to alter or otherwise provide feedback to the user device. In some such embodiments, the recommended route may be changed en route for any of a variety of reasons such as unexpected obstructions, traffic, or the like. Other types of feedback may be obtained by the user device and/or by a user or third party. In embodiments, such feedback is processed on board the vehicle by the user device and the route is confirmed or altered accordingly. In other embodiments, the feedback is sent to a server and the server carries out such processing and alterations if necessary.

In embodiments, the route engine may pass several potential routes to the driver, with associated data (i.e., predicted traversal times and damage factors) for each route. Such information can be displayed to the driver, enabling the driver to decide upon a route. In some such embodiments, the comparison engine may be bypassed entirely.

The methods disclosed herein may be carried out by a system comprising a processor, a memory couple to the processor, the memory configured to store program instructions for instructing the processor to carry out the method. The system comprises a communications module (coupled to the processor and/or the memory as necessary) configured to communicate the recommended route to the user device or any other device suitable for communicating the recommended route to a driver or suitable for causing the requesting vehicle to follow the recommended route. The system may further include the user device—i.e., a device configured to be disposed in a vehicle (either integral with the vehicle or not integral, such as with a mobile device), to send a route request to the route engine, and to receive the communicated recommended route.

Further details and explanations about aspects of the methods and systems of the invention will now be described with reference to certain of the Figures.

Figure 3:
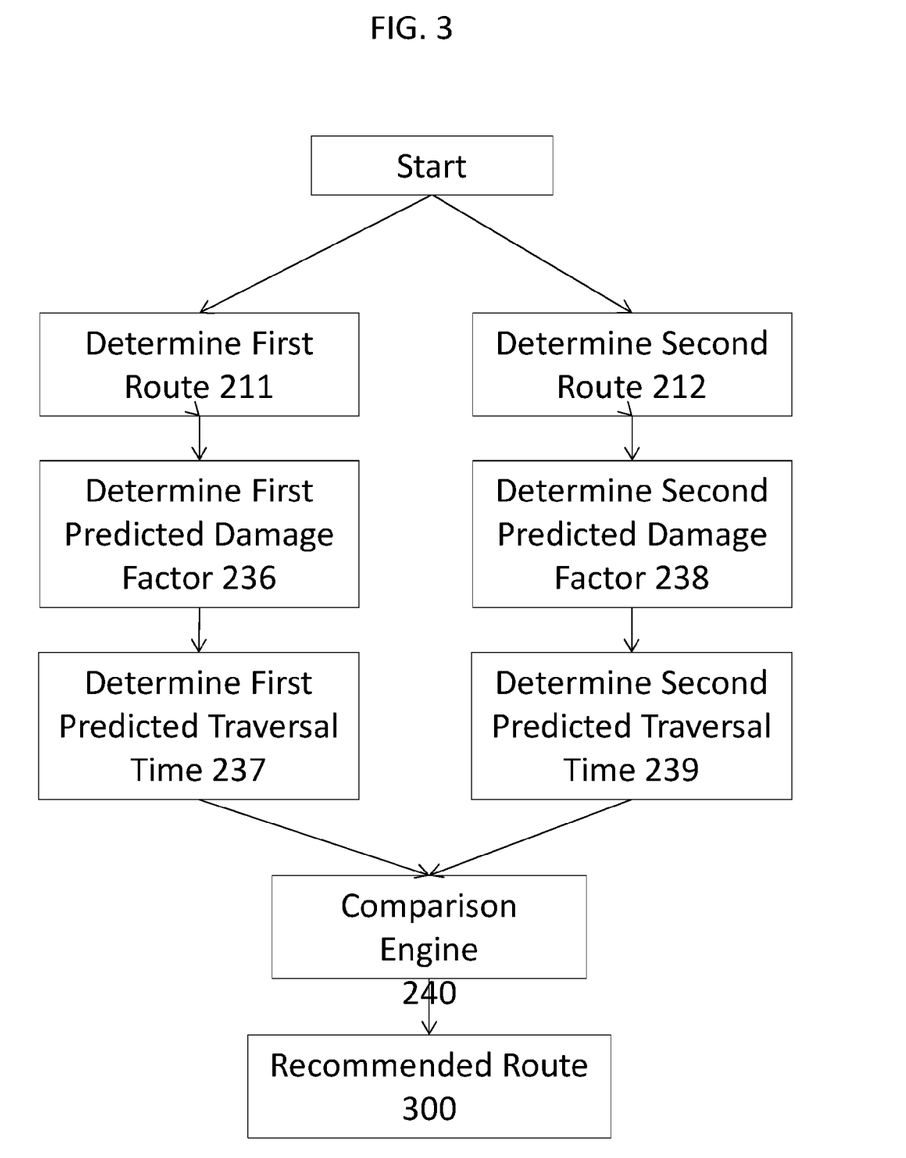
FIG. 3 provides a flow chart showing the operation of a comparison engine in comparing two routes according to an embodiment of the invention.

With reference to FIG. 3, details of the route determiner and route analyser engines are provided. After a route request is received, the route determiner determines a first route 211, and also determines a second route 212. With the first determined route, the system determines a first predicted damage factor 236, and a first predicted traversal time 237. With the second determined route, the system further determines a second predicted damage factor 238, and a second predicted traversal time 239. These data are sent to the comparison engine 240, which compares the routes (appropriately incorporating weighting factors) and provides recommended route 300. Alternatively (not shown) the system can transmit these data directly to the user in order for the user to make a decision as to which route is preferred.

Figure 4:
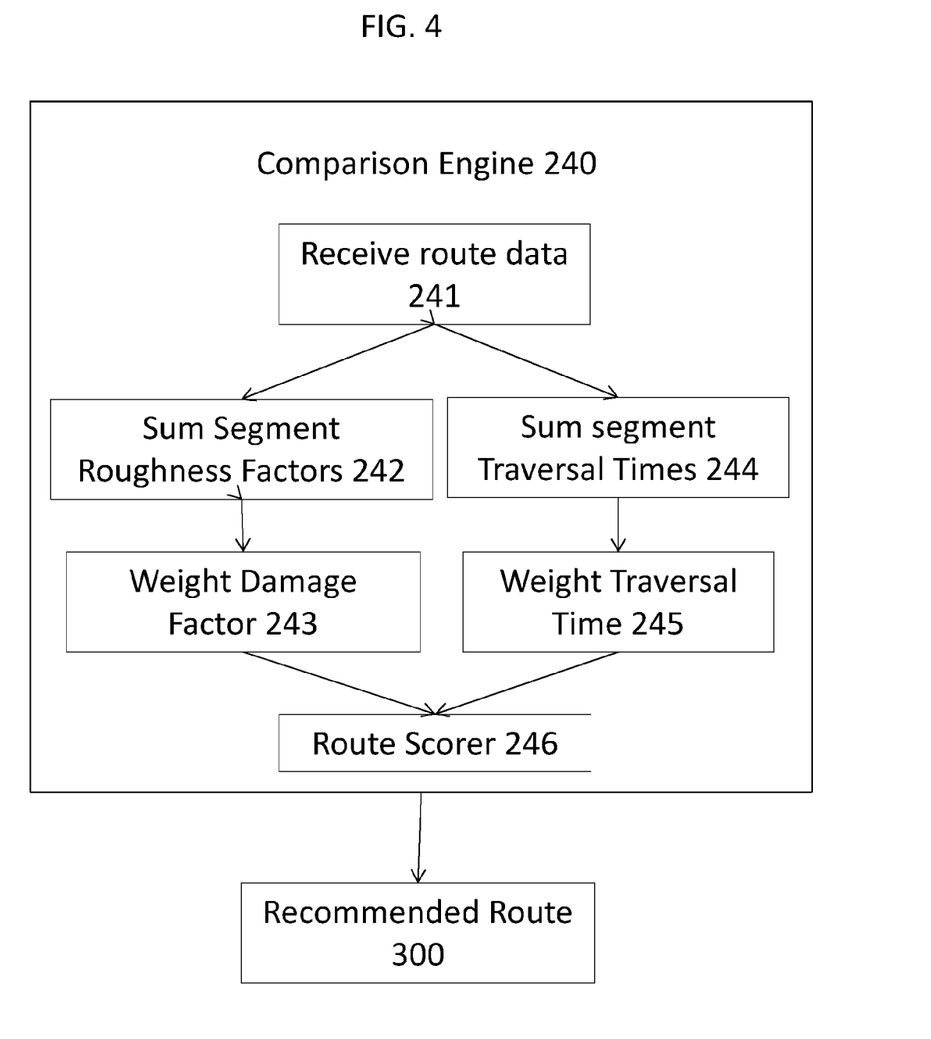
FIG. 4 provides a flow chart showing the operation of a comparison engine in determining a route score according to an embodiment of the invention.

With reference to FIG. 4, an embodiment of comparison engine 240 is shown. Comparison engine 240 receives route data 241, which comprises the route segments and all data associated with each route segment (roughness factors, traversal time, etc.). In an embodiment, comparison engine 240 then sums the segment roughness factors 242 and sums the segment traversal times 244. The aggregated damage factor is weighted 243 and the aggregated traversal time is weighted 245, according to driver input or other indications of the desired weightings. These data are combined in route scorer 246 to provide a score for the route. The process is repeated for a second potential route, and the scores for the two routes are compared. Recommended route 300 is output.

Figure 5:
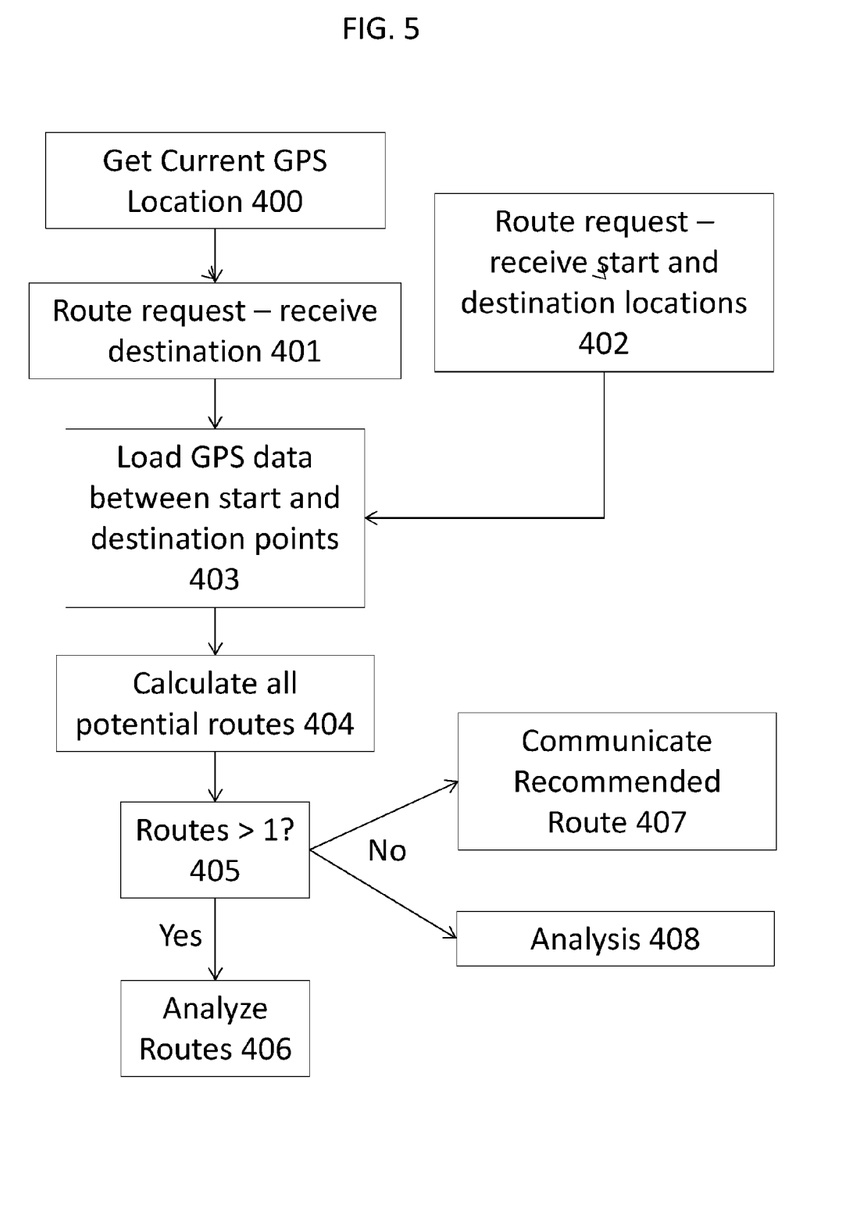
FIG. 5 provides a process flowchart for determining and communicating route information according to an embodiment of the invention.

With reference to FIG. 5, a process flowchart for determining and communicating route information according to an embodiment of the invention is provided. A current GPS location of the user device is automatically obtained 400, and a route request specifying a destination is received 401. Alternatively, a route request is received specifying both the starting location and destination location 402. The starting location and destination location are used to load GPS data between there-between 403. A route determiner (not shown) determines all potential routes 404. The number of determined potential routes determines the next steps (405)—if the number of routes is greater than 1, the system analyses the routes 406 according to the methods disclosed herein. If the number of routes is not greater than 1, the system either communicates the determined route directly 407, or further analyses the route 408 to determine predicted damage factor and predicted traversal time at various possible speeds.

Figure 6:
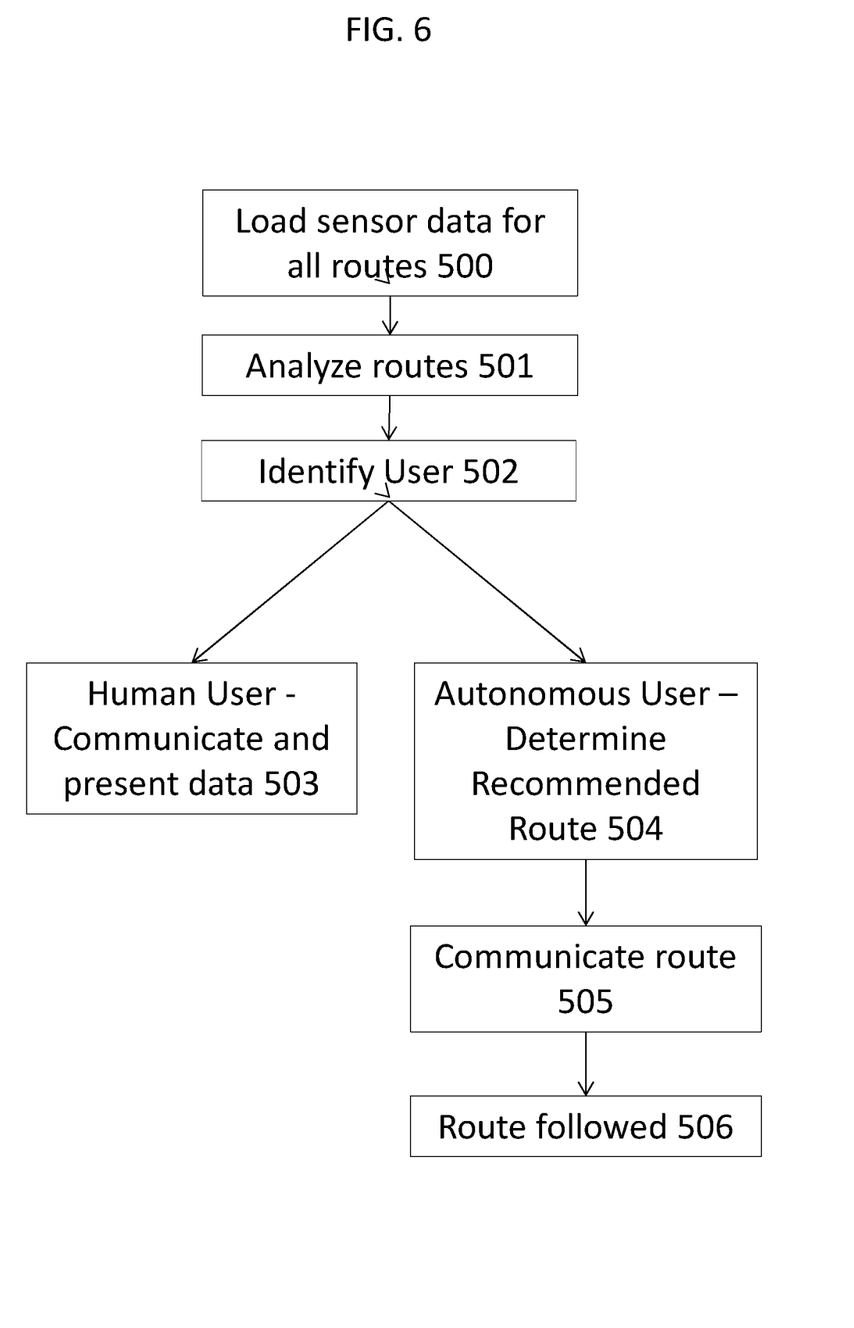
FIG. 6 provides a process flowchart for determining and communicating route information for different users according to an embodiment of the invention.

With reference to FIG. 6, a process flowchart for determining and communicating route information for different users according to an embodiment of the invention is provided. FIG. 6 continues from FIG. 5 along the path where the number of potential routes is found to be greater than 1. The sensor data is loaded from the data store for the determined potential routes 500. The potential routes are analysed 501 according to the methods herein—e.g., predicted damage factors and predicted traversal times for the various routes are determined, either for a single average vehicle speed or over a variety of different possible speeds. The system identifies the user 502 (e.g., human driver or autonomous driver system). For a human driver user, the system communicates and presents the data 503—e.g., the user device receives and presents tuples of predicted damage factors and predicted traversal times, such that the user can select a route based on personal preference. For an autonomous user (autonomous driver system), the system determines a recommended route 504. For example, the system selects the route that optimizes (and minimizes) predicted damage factor and predicted traversal time. The system then communicates the selected route 505, and the autonomous driver system follows the route 506 (i.e., effectuates the route instructions, such as taking appropriate turns, etc.).

Figure 7:
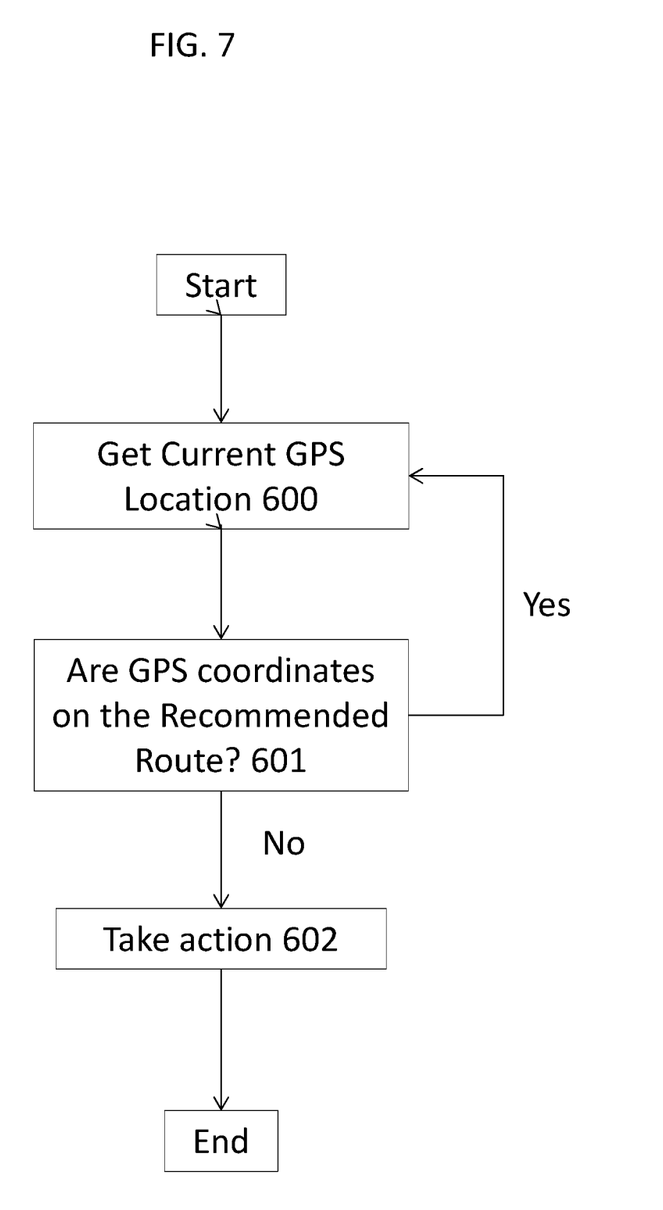
FIG. 7 provides a process flowchart for an autonomous driver system following a recommended route.

With reference to FIG. 7, a process flowchart for an autonomous driver system following a recommended route is provided. The user device gets current GPS location 600. The location is then compared 601 to the recommended route. If the vehicle is on the recommended route, the system continues operation—e.g., the system returns to get current GPS location 600. The system may check the current GPS location on a regular basis (e.g., every second, or every 2, 3, 4, 5, 10, or more seconds, or the like). If the system determines that the current GPS coordinates are not on the recommended route, an action is taken 602. Examples of actions to be taken include: cut the fuel supply to the engine; electronically or otherwise disable the vehicle; correct the course of the vehicle to put the vehicle back on the recommended route; and alert the driver to take manual control. Other actions are also possible. Alerting the driver may be done, for example, through a driver alert system such as a heads-up display or audio message, or any other suitable method.

The systems and methods herein are useful in a variety of applications, including car navigation systems, fleet management, insurance models, and government road maintenance planning.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

It will be appreciated that the current methods can be partially or wholly implemented on a "local" device for offline operation—i.e., without communicating with a server. In such embodiments, the used device stores road segment data and other data as necessary and appropriate. In such embodiments, the disclosure herein applies with necessary modifications (e.g., information and routes are not communicated from a server but are determined by the local device). Updating of the user device when network communications are available ensures that up-to-date information is available on the user device.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

Examples

Calculate the damage factor based on roughness and reasonable speed:

Damage=roughness*speed^2*time.

Alternatively, in the above equation, speed can be replaced with distance, since a varying amount of distance will also vary the amount of damage incurred by a vehicle. Furthermore, in the above equation, speed can be a function of the predicted traversal time.

Assume a driver controls the speed to minimize the costs. The driver can choose from a minimal partial order set of damage derived cost and ETA* derived cost, or, a car navigation system can propose best routes by inferring the driver's preference (e.g., from historical choice and/or heuristics).

Further assume that a driver will take a speed that will minimize ETA and damage (but can weight these two in various situation, such as were minimal time is critical in an emergency). Lower time may means lower damage because the car is on the road for less time, but may also mean greater damage because the car is traveling faster and therefore encountering road hazards at a greater speed.

For example, the overall cost of a route R made of road segments $R_i \in \mathbb{N}_R$ can be defined as:

$$C^R = \min_{\bar{s}_i - \Delta s_i | i \in \mathbb{N}_R} \left( \sum_i C_i^{ETA} + c * \sum_i C_i^{Damage} \right)$$

$$= \sum_i \min_{\bar{s}_i - \Delta s_i} \left( \sum_i C_i^{ETA} + c * \sum_i C_i^{Damage} \right)$$

where:

$$C_i^{ETA} = \frac{l_i}{\bar{s}_i - \Delta s_i}$$

$$C_i^{Damage} = r_i (\bar{s}_i - \Delta s_i)^2 \cdot C_i^{ETA}$$
$$= r_i \cdot l_i (\bar{s}_i - \Delta s_i)$$

and where:

$\bar{s}_i - \Delta s_i$ is the speed of the car for the segment $R_i$, $l_i$ is the length of $R_i$, and $r_i$ is the roughness of $R_i$ depending on the make of the car.

Furthermore:

$$C_i^{ETA} = \frac{l_i}{\bar{s}_i - \Delta s_i} + r_i \cdot l_i (\bar{s}_i - \Delta s_i)$$

$$\min_{\bar{s}_i - \Delta s_i} (C_i^{ETA} + cC_i^{Damage}) = l_i (r_i + 1)$$

where $r_i = cr_i$

Also:

$$C_i = \min_{\bar{s}_i - \Delta s_i} (C_i^{ETA} + cC_i^{Damage}) = \min_{\bar{s}_i - \Delta s_i} \left( \frac{l_i}{\bar{s}_i - \Delta s_i} + c \cdot r_i \cdot l_i \cdot (\bar{s}_i - \Delta s_i), \right) =$$

-continued $$\begin{cases} \frac{l_i}{\bar{s}_i} \text{ (min when } \Delta s_i = 0\text{), iff } r_i = 0 \\ l_i(cr_i\bar{s}_i + 1)\text{(min when } \Delta s_i = 0\text{), iff } 0 < r_i \leq \frac{1}{c\bar{s}_i} \\ l_i(r'_i + 1)\left(\text{min when } \Delta s_i = \frac{1}{cr_i}\right), \text{ iff } \frac{1}{c\bar{s}_i} < r_i \end{cases}$$

The invention claimed is:

1. A method, the method comprising:
determining, by at least one processor, a first predicted damage factor and a first predicted traversal time associated with a vehicle traversing a first route based on sensor data from one or more sensors on one or more preceding vehicles associated with the first route;
determining, by the at least one processor, a second predicted damage factor and a second predicted traversal time associated with the vehicle traversing a second route different from the first route based on sensor data from one or more sensors on one or more preceding vehicles associated with the second route;
weighting, by the at least one processor, the first predicted damage factor, the first predicted traversal time, the second predicted damage factor, and the second predicted traversal time, to obtain, respectively, a weighted first predicted damage factor, a weighted first predicted traversal time, a weighted second predicted damage factor, and a weighted second predicted traversal time;
calculating, by the at least one processor, a recommended route based on the weighted first predicted damage factor, the weighted second predicted damage factor, the weighted first predicted traversal time, and the weighted second predicted traversal time; and
communicating, by a communications module coupled to the at least one processor, the recommended route to a user device of a user;
wherein the communicated recommended route is configured such that the user device, upon receiving the recommended route, carries out an action selected from: modifying a graphical user interface to display the recommended route; and initiating an autonomous driving system to navigate a vehicle along the recommended route.

2. The method of claim 1, wherein the user is the autonomous driver system and the recommended route comprises a set of instructions configured to cause the autonomous driver system to proceed along the recommended route.

3. The method of claim 1, wherein the user is a human driver and the recommended route comprises a set of directions for output in a driver alert system.

4. The method of claim 1, wherein the first route is between a first geo-location and a second geo-location, and wherein the second route is between the first geolocation and second geo-location.

5. The method of claim 1, wherein the first route is a sequence of connected road segments, each with an associated roughness factor, and wherein the first predicted damage factor is determined based on the roughness factors of the road segments of the first route, and wherein the second route is a sequence of connected road segments, each with an associated roughness factor, and wherein the second predicted damage factor is determined based on the roughness factors of the road segments of the second route.

6. The method of claim 1, wherein the determined first and second predicted damage factors are specific to the vehicle.

7. The method of claim 1, wherein calculating the recommended route further factors a history of the vehicle selected from historical sensor data collected by the vehicle along at least one of the road segments on the recommended route, and an aggregated wear factor determined from sensor data collected by the vehicle over a period of the vehicle's history.

8. The method of claim 1, wherein the first route is a sequence of connected road segments, each road segment having an associated roughness factor, the roughness factor being determined from historical sensor readings obtained from the one or more preceding vehicles fitted with one or more sensors and traversing the road segment.

9. The method of claim 1, wherein the determined first and second predicted damage factors are determined for an average speed for the first and second routes, respectively.

10. The method of claim 1, wherein the recommended route is selected to minimize damage to the vehicle and to simultaneously minimize time required to traverse the recommended route.

11. The method of claim 1, wherein the recommended route comprises a recommended sequence of connected road segments and wherein the vehicle traverses the recommended sequence of road segments of the recommended route.

12. A method for reducing damage to a vehicle traveling from a first geo-location to a second geo-location, the method comprising:
transmitting, from a server including at least one processor, via a network, a recommended route to a device on the vehicle, the device configured to receive the recommended route and instruct a user to take the recommended route, wherein the recommended route is selected from at least two available routes connecting the first and second geo-locations, and is selected at least in part to optimize predicted traversal time and predicted damage factor, the predicted traversal time and predicted damage factor determined based on sensor data obtained from one or more sensors on one or more vehicles;
wherein the transmitted recommended route is configured such that the device on the vehicle, upon receiving the recommended route, carries out an action selected from: modifying a graphical user interface to display the recommended route; and initiating an autonomous driving system to navigate the vehicle along the recommended route.

13. The method of claim 12, further comprising determining an identifying characteristic of the vehicle and a status of the vehicle, wherein the recommended route is selected at least in part on the determined identifying characteristic and status.

14. The method of claim 12, wherein the user is the autonomous driver system and the recommended route comprises a set of instructions configured to cause the autonomous driver system to proceed along the recommended route.

15. The method of claim 12, wherein the user is a human driver and the recommended route comprises a set of directions for output in a driver alert system.

16. A system comprising a processor, a memory coupled to the processor, the memory configured to store program instructions for instructing the processor to:

(a) receive an inquiry from a user device specifying a first geo-location and a second geo-location,
(b) calculate an aggregate predicted traversal time and aggregate predicted damage factor for at least two available routes between the first and second geolocations, the aggregate predicted traversal time and the aggregate predicted damage factor being determined based on sensor data obtained from one or more sensors on one or more vehicles,
(c) select a recommended route from the at least two available routes, the selection at least in part made to optimize predicted traversal time and predicted damage factor, and
(d) transmit, via a network and a communications module, the recommended route to the user device, wherein the transmitted recommended route is configured such that the user device, upon receiving the recommended route, carries out an action selected from: modifying a graphical user interface to display the recommended route; and initiating an autonomous driving system to navigate a vehicle along the recommended route.

17. The system of claim 16, wherein the memory is further configured to store program instructions for instructing the processor to:
(e) receive sensor data from a plurality of vehicles traversing a road segment,
(f) calculate a predicted traversal time and a predicted damage factor for the road segment based on the received sensor data, and
(g) repeat steps (e) and (f) for a plurality of road segments to calculate a plurality of predicted traversal times and predicted damage factors for the plurality of road segments.

* * * * *